(12) United States Patent
Raghavan et al.

(10) Patent No.: US 8,457,190 B2
(45) Date of Patent: Jun. 4, 2013

(54) SUMMER BLOCK FOR A DECISION FEEDBACK EQUALIZER

(75) Inventors: Bharath Raghavan, Irvine, CA (US); Afshin Momtaz, Laguna Hills, CA (US); Jun Cao, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 337 days.

(21) Appl. No.: 12/878,689

(22) Filed: Sep. 9, 2010

(65) Prior Publication Data

US 2012/0027074 A1 Feb. 2, 2012

Related U.S. Application Data

(60) Provisional application No. 61/369,511, filed on Jul. 30, 2010.

(51) Int. Cl.
*H03H 7/30* (2006.01)
*H03H 7/40* (2006.01)
*H03K 5/159* (2006.01)

(52) U.S. Cl.
USPC .......................................... 375/233; 708/323

(58) Field of Classification Search
USPC .................. 375/229–230, 233, 350; 708/300, 708/323
See application file for complete search history.

(56) References Cited

U.S. PATENT DOCUMENTS

| | | | |
|---|---|---|---|
| 8,135,100 B2 * | 3/2012 | Beukema et al. | 375/350 |
| 2009/0060021 A1 * | 3/2009 | Bulzacchelli | 375/233 |
| 2010/0046683 A1 * | 2/2010 | Beukema et al. | 375/355 |
| 2010/0054324 A1 * | 3/2010 | Bulzacchelli et al. | 375/233 |

* cited by examiner

*Primary Examiner* — Jean B Corrielus
(74) *Attorney, Agent, or Firm* — Sterne, Kessler, Goldstein & Fox P.L.L.C.

(57) ABSTRACT

Embodiments of a summer block for a Decision Feedback Equalizer are provided herein. The summer block is configured to offset a combination of a Feed Forward Equalized (FFE) data signal and a Feedback Equalized (FBE) data signal by a dc amount: The dc amount is based on at least a weight of a tap previously implemented with an FBE of the DFE. The summer block can be further configured to offset the combination of the FFE data signal and the FBE data signal based on a dc offset value necessary to compensate for asymmetries in the data eye of data received by the FFE over a channel and a dc offset value necessary to compensate for mismatches present in the circuits of the DFE.

17 Claims, 7 Drawing Sheets

SUMMER BLOCK FOR A DECISION FEEDBACK EQUALIZER

CROSS REFERENCE TO RELATED APPLICATIONS

This application claims the benefit of U.S. Provisional Patent Application No. 61/369,511, filed Jul. 30, 2010, entitled "Summer Block for a Decision Feedback Equalizer," which is incorporated herein by reference in its entirety.

FIELD OF THE INVENTION

This application relates generally to communication systems and more particularly to decision feedback equalizers (DFEs) for communication systems.

BACKGROUND

Communication systems are designed to transfer information between two devices over a medium in the presence of disturbing influences. Intersymbol interference (ISI) is one well-known disturbing influence in which transmitted symbols become elongated and interfere with adjacently transmitted symbols. This spreading or "smearing" of symbols is generally caused by bandwidth limitation and interference associated with all communication mediums and/or multipath propagation within those mediums. Because ISI has the same effect as noise, communication is made less reliable.

One of the most basic solutions for mitigating the effects of ISI is slowing down the speed at which symbols are transmitted over a medium. More specifically, the transmission speed can be slowed down such that a symbol is only transmitted after allowing previously transmitted symbol pulses to dissipate. The time it takes for a symbol pulse to dissipate is called delay spread, whereas the original time of the symbol pulse (including any time before the next symbol pulse is transmitted) is called the symbol time. No ISI will occur if the delay spread is less than or equal to the symbol time.

Although slowing down the bit rate can eliminate the effects of ISI, it is generally an unacceptable solution for many of today's communication applications. In fact, many of today's communication applications require speeds in the multi-gigabit per second range. At such high speeds, ISI can completely overwhelm a signal transmitted over a few inches of printed circuit board trace, a few feet of copper cable, or a few tens of meters of multimode optical fiber. To further compound the problem, ISI can change over time with temperature, positioning, and the impedance of the communication medium, for example.

Therefore, an adaptive filtering process, referred to as equalization, is often used to flatten the frequency response of a communication medium and mitigate the effects of ISI. One common filtering architecture used to flatten the frequency response of a communication medium is the Decision Feedback Equalization (DFE) architecture. The performance of the DFE architecture is generally limited by non-idealities such as frequency response, noise, nonlinearity, and mismatch associated with its data path and the data it operates on. As a result, DFE architectures are conventionally implemented with several different circuit elements to compensate for non-idealities, such as mismatch between devices used to implement the DFE. However, these compensation circuit elements increase the load of the data path and, as a result, decrease the speed at which the DFE architecture can operate. Any decrease in speed limits the usefulness of the DFE architecture in many of today's high-speed applications.

Therefore, what is needed is a DFE architecture that can compensate for one or more non-idealities, such as mismatch between devices used to implement the DFE, while limiting additional loading.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
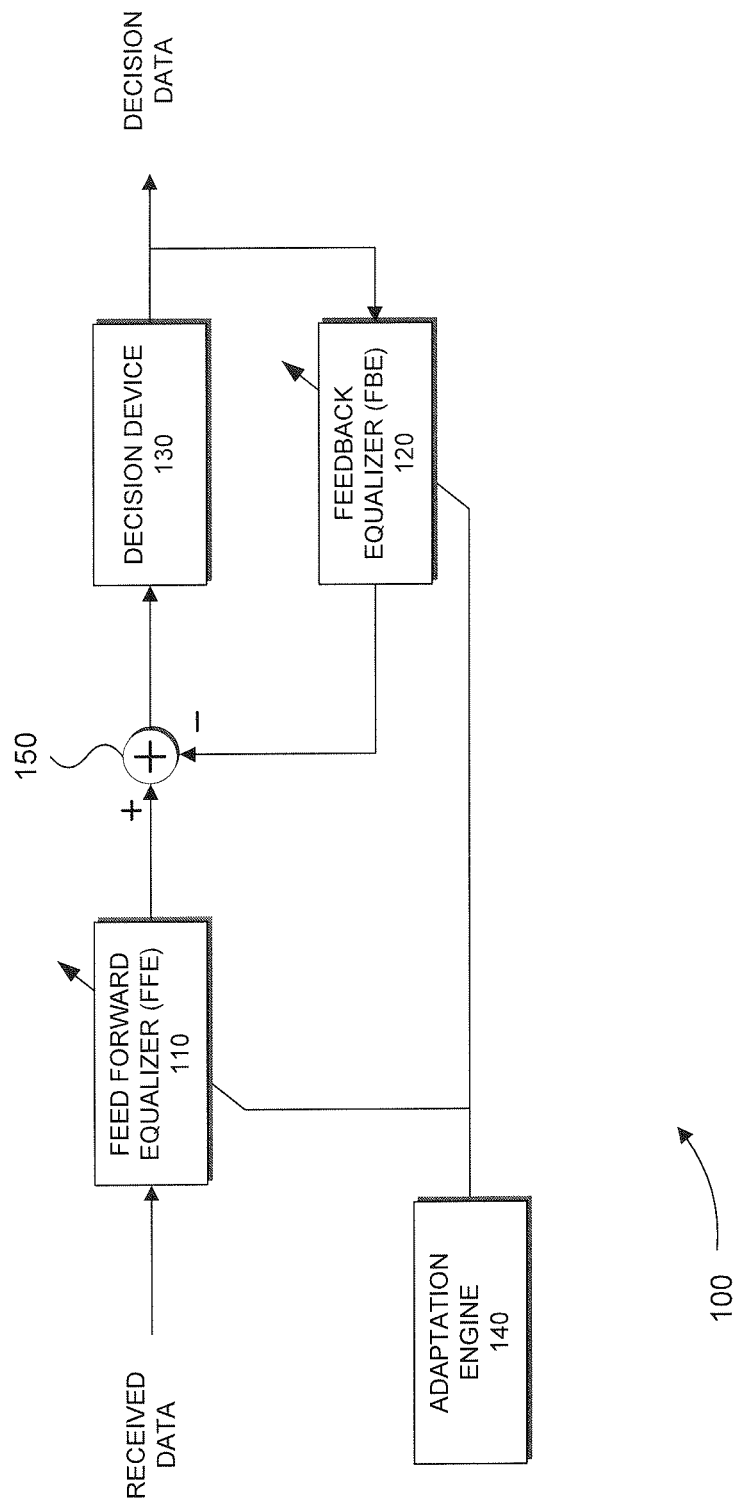
FIG. 1 illustrates a block diagram of a DFE, according to embodiments of the present invention.

FIG. 1 illustrates an exemplary block diagram of a Decision Feedback Equalizer (DFE) 100, according to embodiments of the present invention. DFE 100 includes a Feed Forward Equalizer (FFE) 110, a Feedback Equalizer (FBE) 120, a decision device 130, an adaptation engine 140, and a combiner 150. In an embodiment, DFE 100 is implemented in a wired or wireless receiver. For example, DFE 100 can be implemented within a cellular device, satellite system, cable modem, LAN device, home networking device, or any other wireless or wired device that includes a receiver. In another embodiment, DFE 100 is implemented within a receiver communicating over a backplane. In such an implementation, DFE 100 can be included within a serializer/deserializer (SerDes), for example.

In general, DFE 100 is a nonlinear equalizer that uses previous symbol decisions to eliminate intersymbol interference (ISI) from pulses received over a channel that suffers from bandwidth limitation and/or multipath propagation. There are two specific types of ISI: precursor ISI and post-cursor ISI. Precursor ISI refers to interference caused by one or more future symbols on a current symbol, whereas post-cursor ISI refers to interference caused by one or more past symbols on a current symbol.

FFE 110 is configured to reduce the negative influence of precursor ISI on a current data symbol received over the channel. Specifically, FFE 110 is configured to delay a current data symbol by one or more symbol periods so that future symbols that interfere with the current symbol can be accessed for data decoding. Once accessed, an appropriately weighted combination of the future symbol(s) can be used to compensate for precursor ISI interfering with the current symbol.

Figure 2:
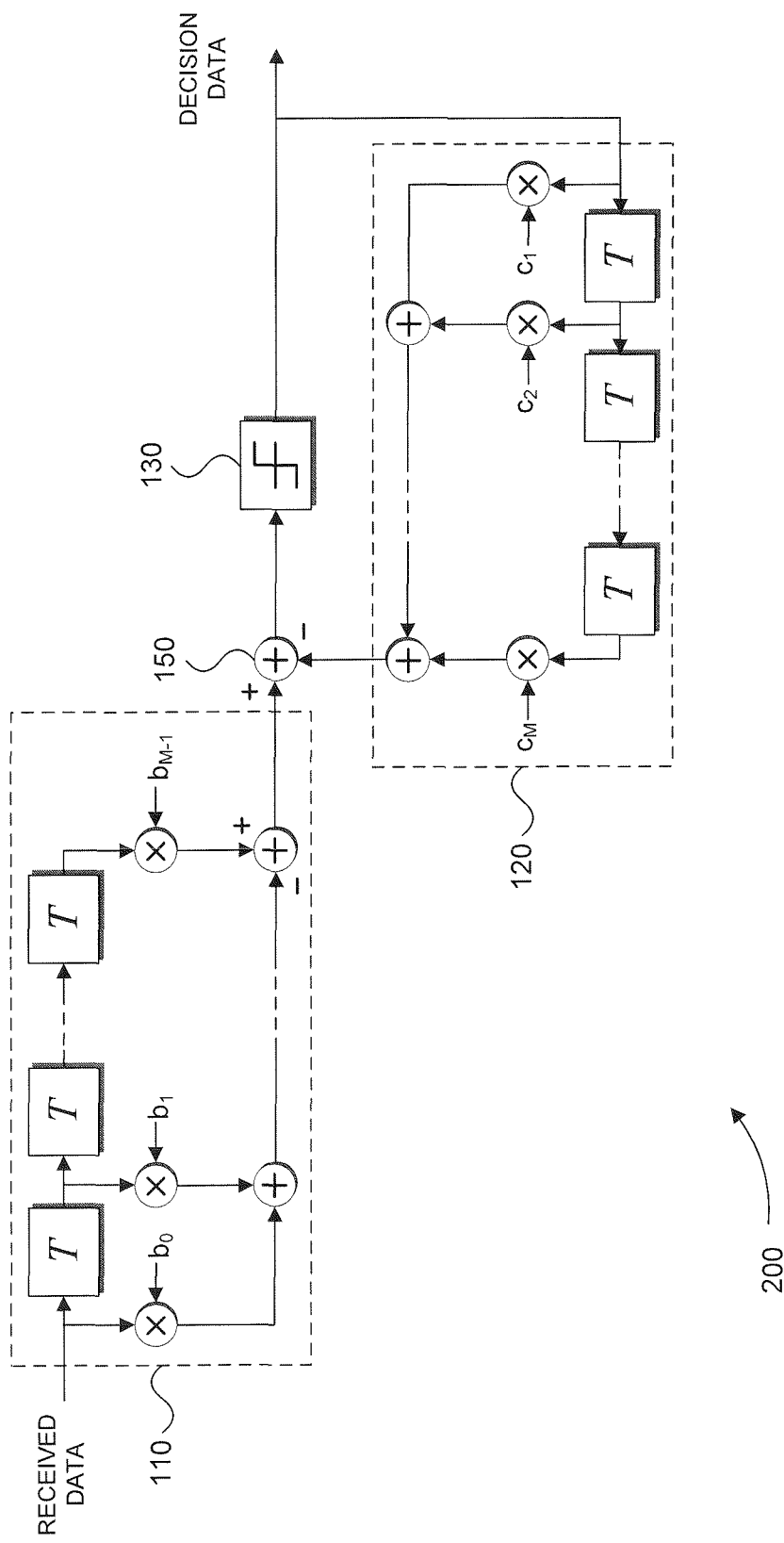
FIG. 2 illustrates a detailed block diagram of a DFE, according to embodiments of the present invention.

In general, a series of delay elements and taps are used by FFE 110 to compensate for the precursor contribution of one or more future symbols on a current symbol. The future symbols are stored in and tapped from the series of delay elements. The tapped values are then multiplied by respective tap weights that are related to the extent of precursor ISI contributed by the future symbols. The resulting products are then subtracted from the current symbol being processed by FFE 110 to substantially eliminate precursor ISI. The tap weights of FFE 110 are determined by adaptation engine 140 and can be continually adapted by adaptation engine 140 to change with the conditions of the channel over which the data is received. Additional details of FFE 110 are illustrated in FIG. 2 and explained further below.

It should be noted that FFE 110 is optionally included in DFE 100. In other embodiments, FFE 110 is included solely in the transmitting device as opposed to the receiving device that implements DFE 100 illustrated in FIG. 1.

FBE 120 is configured to reduce the negative influence of post cursor ISI on a current data symbol received over the channel. As noted above, post cursor ISI refers to the interference of one or more past symbols on a current symbol. For example, if a symbol received prior to the current symbol is decided to be a logical one value by decision device 130, it is known that the signal level of the current symbol (assuming it is effected by the preceding symbol and PAM 2 differential signaling is used) is slightly shifted upward because of post cursor ISI contributed by the preceding symbol. Conversely, if a symbol received prior to the current symbol is decided to be a logical zero value by decision device 130, it is known that the signal level of the current symbol (assuming it is affected by the preceding symbol and PAM 2 differential signaling is used) is slightly shifted downward because of post cursor ISI contributed by the preceding symbol. Thus, once the value of a received symbol is decided by decision device 130, that value can be fed back to FBE 120 where it can be used to remove post cursor ISI from a current symbol.

In general, a series of delay elements and taps are used by FBE 120 to compensate for post cursor contributions from one or more previously decided symbols on a current symbol.

The previously decided symbols are stored in the series of delay elements within FBE 120 and are multiplied by respective tap weights that are related to the extent of post cursor ISI contributed by the decided symbols. The resulting products are then subtracted by combiner 150 from the current symbol output by FFE 110 to substantially eliminate any post cursor ISI from the current symbol. The tap weights of FBE 120 are determined by adaptation engine 140 and can be continually adapted by adaptation engine 140 to change with the conditions of the channel over which the data is received. Additional details of FBE 120 are illustrated in FIG. 2 and explained further below.

The output of combiner 150 represents equalized data (in this case, data that has been equalized for both post cursor and precursor ISI). Decision device 130 is configured to receive the equalized data as a series of symbols and decide whether each symbol is, for example, a logical one value or a logical zero value. Removal of ISI from the symbols, which effectively acts as noise, helps to ensure all symbol values are decided correctly. The output of decision device 130 (ideally) represents the original data transmitted over the channel.

FIG. 2 illustrates an exemplary detailed block diagram of a DFE 200 that includes the same basic structure as DFE 100, according to embodiments of the present invention. As illustrated in FIG. 2, FFE 110 is implemented as an FIR filter that includes one or more continuous-time delay elements denoted by the symbol T and one or more multipliers. The delay elements are cascaded to store and shift successive symbols of the received data. FFE 110 can include as few as one delay element (and one tap) in some embodiments of FFE 110.

A current symbol being processed by FFE 110 (to remove precursor ISI) is stored in the last delay element in the chain of delay elements, whereas future symbols (i.e., symbols transmitted and received after the current symbol) are stored in the remaining delay elements. The future symbols stored in the delay elements and just received are multiplied by respective tap weights $b_0$-$b_{M-2}$. The tap weights are related to the extent of precursor ISI contributed by the future symbols. For example, tap weight $b_1$ represents a good approximation of the amount of precursor ISI contributed by the future symbol stored in the first delay element of FFE 110.

The resulting products of the multipliers are subtracted from the current symbol being processed by FFE 110 to substantially eliminate precursor ISI from that symbol. The current symbol, as illustrated in FIG. 2, can be further multiplied by a tap weight $b_{M-1}$. The tap weights of FFE 110 are determined by adaptation engine 140 (not shown) and can be continually adapted by adaptation engine 140 to change with the conditions of the channel over which the data is received.

As further illustrated in FIG. 2, FBE 120 is implemented as an FIR filter that includes one or more delay elements (i.e., D flip-flops or clocked memory elements) denoted by the symbol T and one or more multipliers. The delay elements are arranged in a shift register configuration and are configured to store and shift successive decision data feed back from decision device 130. FBE 120 can include as few as one delay element (and one tap) in some embodiments of FBE 120.

The current symbol being processed by FBE 120 to remove post cursor ISI is provided at the output of FFE 110 to combiner 150. The decision data stored in the delay elements of FBE 120 and just fed back from decision device 130 are multiplied by respective tap weights $c_1$-$c_M$. The tap weights are related to the extent of post cursor ISI contributed by the decided symbols. For example, tap weight $c_2$ represents a good approximation of the amount of post cursor ISI contributed to the current symbol by the previously decided symbol stored in the first delay element of FBE 120.

The resulting weighted contribution of previously decoded symbols is then subtracted by combiner 150 from the current symbol, provided at the output FFE 110, to substantially eliminate any post cursor ISI. The tap weights of FFE 110 are determined by adaptation engine 140 (not shown) and can be continually adapted by adaptation engine 140 to change with the conditions of the channel over which the data is received.

Decision device 130 is illustrated in FIG. 2 as a one-bit slicer (or a D flip-flop, for example) that determines whether each equalized data symbol received from combiner 150 is above or below a predefined threshold. For example, if zero volts is the threshold used by decision device 130 to decide whether a received symbol is either a logical one or a logical zero value, then any received symbol that has a voltage below the zero volt threshold will be determined to be a logical zero value by decision device 130 and any received symbol that has a voltage above the zero volt threshold will be determined to be a logical one value by decision device 130. Decision device 130 outputs a "clean" logical one value or logical zero value (i.e., a logical value having a voltage near its expected or ideal voltage value) for each received symbol based on its determination. The output of decision device 130 (ideally) represents the original data transmitted over the channel.

DFEs, such as DFE 100 and DFE 200, are often the equalization architecture of choice for many receiver applications because they offer a good compromise between cost and performance. However, as today's applications continue to push transmission speeds faster and faster into the multi-GHz range, for example, the conventional DFE architecture is often unable to adequately perform. A major challenge in the design and use of the conventional DFE architecture in high speed applications is meeting the timing requirement in the feedback path of the DFE. This issue is particularly pronounced for the path containing the first tap computation in the FBE (e.g., the path in the FBE that performs the multiplication of a previously decided symbol and the first tap weight of the FBE).

Figure 3:
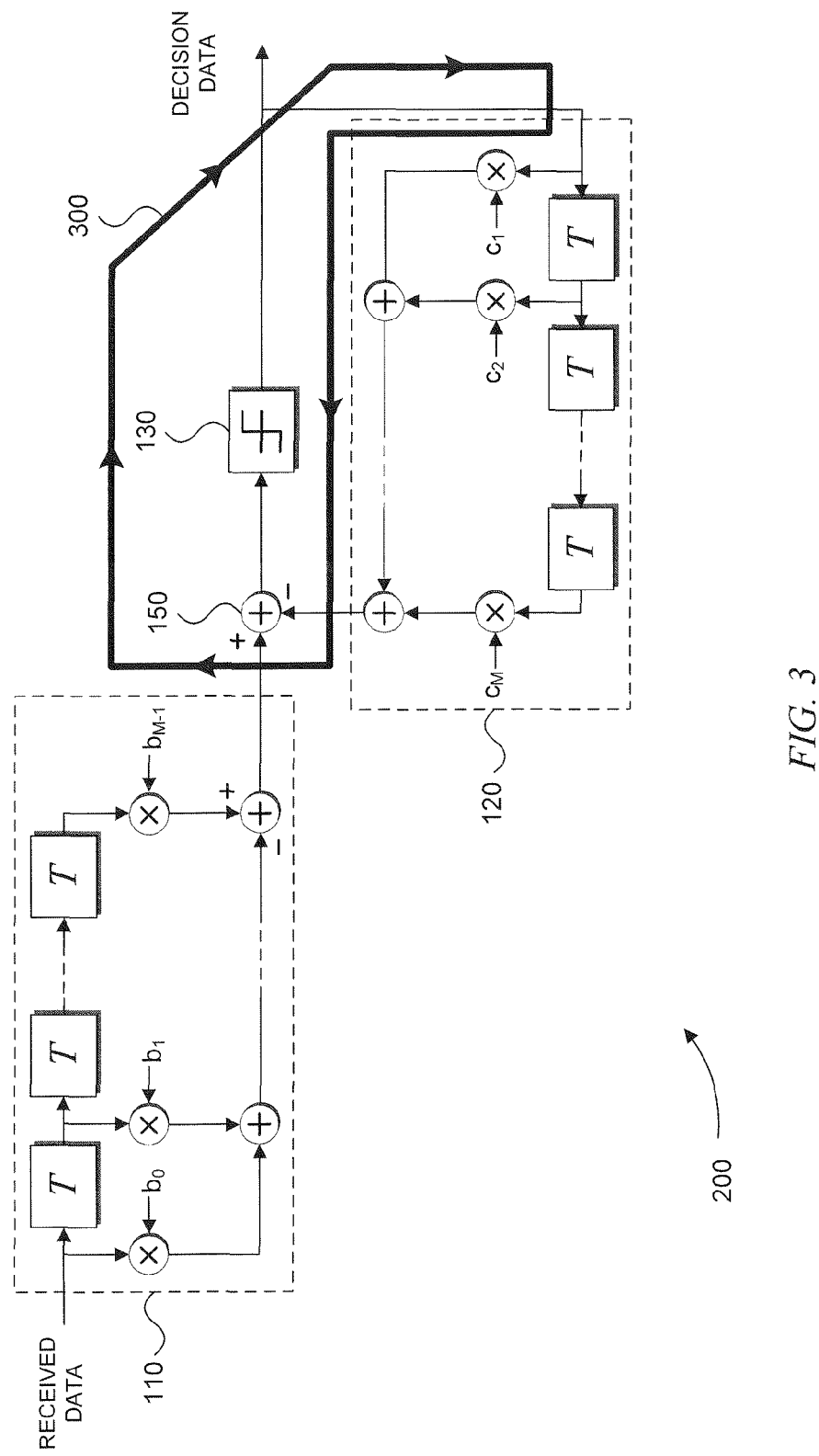
FIG. 3 illustrates a critical path within a DFE, according to embodiments of the present invention.

For example, in DFE 200, a decided symbol from decision device 130 has to be multiplied by the appropriate tap weight $c_1$ in FBE 120, subtracted from the symbol provided by FFE 110 at combiner 150, and then the resulting output of combiner 150 has to be stable at the input of decision device 130 all within a single clock cycle. A clock cycle can be as small as 100 ps in a 10 Gbps PAM-2 link. Because the path containing the first tap in the DFE feedback loop is typically the critical path (i.e., the path requiring the longest delay), it sets the upper bound on how fast DFE 200 can operate. FIG. 3 highlights this critical path 300 within DFE 200.

As a result of the long delay typically required for critical path 300, in many high-speed links the first tap in the FBE is not computed, or a technique referred to as loop-unrolling is utilized.

Figure 4:
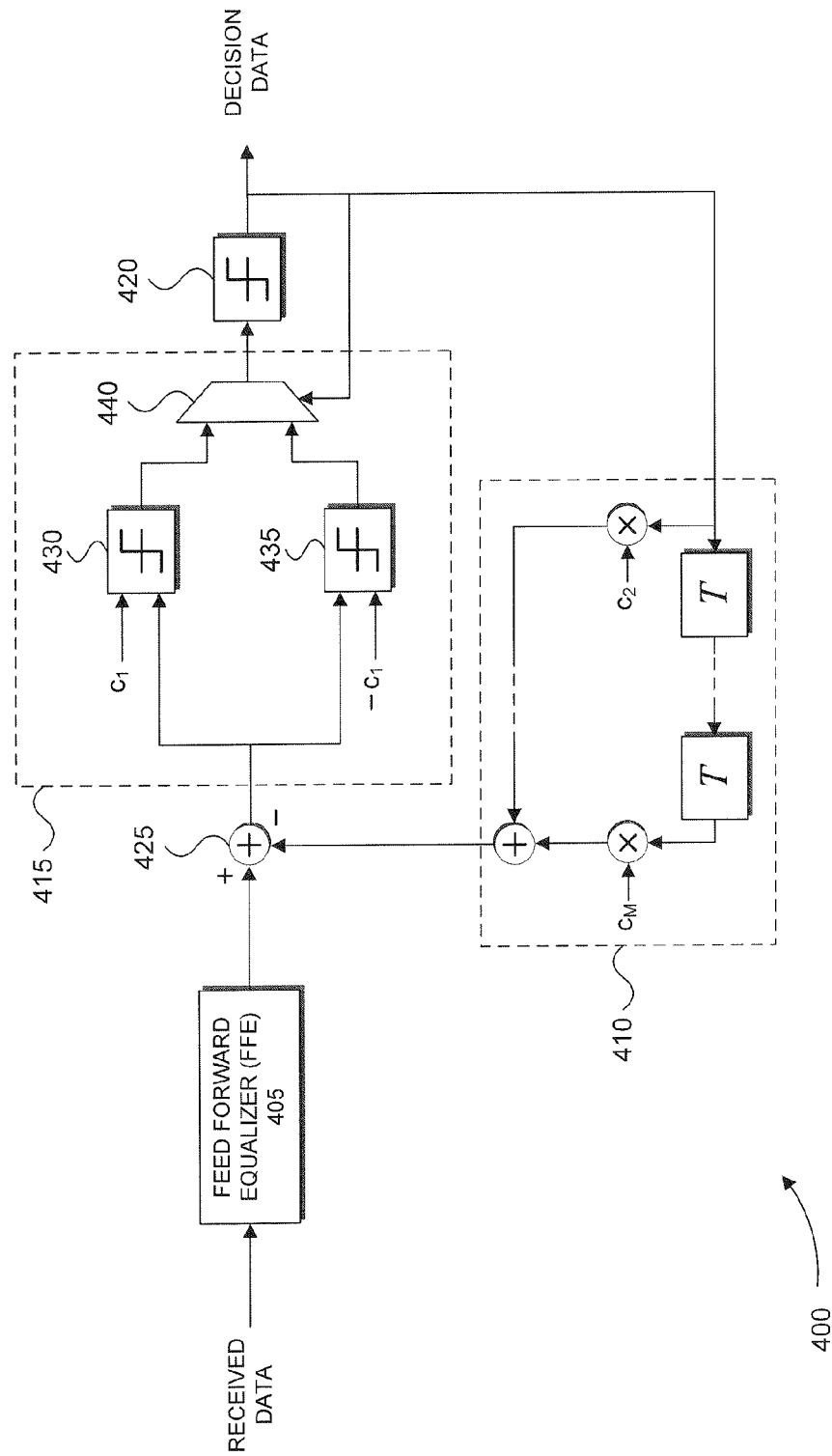
FIG. 4 illustrates a block diagram of a loop-unrolled DFE, according to embodiments of the present invention.

FIG. 4 illustrates an exemplary block diagram of a loop-unrolled DFE 400, according to embodiments of the present invention. In an embodiment, loop-unrolled DFE 400 is implemented in a wired or wireless receiver. For example, loop-unrolled DFE 400 can be implemented within a cellular device, satellite system, cable modem, LAN device, home networking device, or any other wireless or wired device that includes a receiver. In another embodiment, loop-unrolled DFE 400 is implemented within a receiver communicating over a backplane. In such an implementation, loop-unrolled DFE 400 can be included within a serializer/deserializer (SerDes), for example.

DFE 400 includes an optional FFE 405, an FBE 410, a loop-unrolling device 415, a decision device 420, and a combiner 425. DFE 400 contains a similar structure as DFE 200 illustrated in FIG. 2. However, the loop (or path) that performs the first tap computation of FBE 210 in FIG. 2 has been "un-rolled" and implemented by loop-unrolling device 415.

As illustrated in FIG. 4, loop-unrolling device 415 has two parallel paths that essentially pre-compute the resultant product of the first tap of the FBE for both possible outcomes (i.e., a logical one or a logical zero) of decision device 420. In other words, rather than waiting for decision device 420 to determine the next output value before computing the resultant product of that output and the first tap weight of FBE 410 (implemented within loop-unrolling device 415), loop-unrolling device 415 pre-computes the resultant product for both possible outcomes ahead of time.

Specifically, the first parallel path of loop-unrolling device 415, which includes slicer 430, presupposes that the next decided value output from decision device 420, corresponding to the bit received prior to the bit being currently processed in the incoming serial data stream, will be a logical one value. Slicer 430 receives the output of combiner 425 at a first input and receives the first post cursor ISI tap weight $c_1$ as a second input. The threshold level of slicer 430 is offset (or increased) from the original threshold level separating a logical one value from a logical zero value by the first post cursor ISI tap weight $c_1$. If the output of combiner 425 is greater than the offset threshold of slicer 430, a logical one value is output by slicer 430 and received by multiplexer 440 at a first input, else a logical zero value is output by slicer 430 and received by multiplexer 440.

The second parallel path includes slicer 435 and operates in the same manner as the first parallel path discussed above. However, the second parallel path presupposes that the decided value output from decision device 420 will be a logical one value and therefore offsets (or decreases) the threshold of slicer 435 by the negative value of the first post cursor ISI tap weight $c_1$. If the output of combiner 425 is greater than the offset threshold of slicer 435, a logical one value is output by slicer 435 and received by multiplexer 440 at a second input, else a logical zero value is output by slicer 435 and received by multiplexer 440.

Once decision device 420 determines the next decided symbol value at its output, the decided symbol value can be used as the select input to multiplexer 440. Thus, the output of the parallel path in loop-unrolling device 415 that corresponds to the actual symbol value output by decision device 420 is selected. Loop-unrolling device 415 thereby eliminates critical path 300 illustrated in FIG. 3. It should be noted that DFE 400 can be modified to unroll any number of additional tap computations included within FBE 410. In addition, it should be noted that any tap computations included within FBE 410 can be unrolled. For example, in one embodiment, both the first and second tap computations within FBE 410 can be unrolled.

Although loop-unrolling can be used to increase the operating speed of the conventional DFE architecture, often the increase falls short of what is required, especially after additional delay from compensation circuits (not shown) implemented within many DFE architectures is accounted for. These compensation circuits are illustrated in FIG. 5 and described further below.

Figure 5:
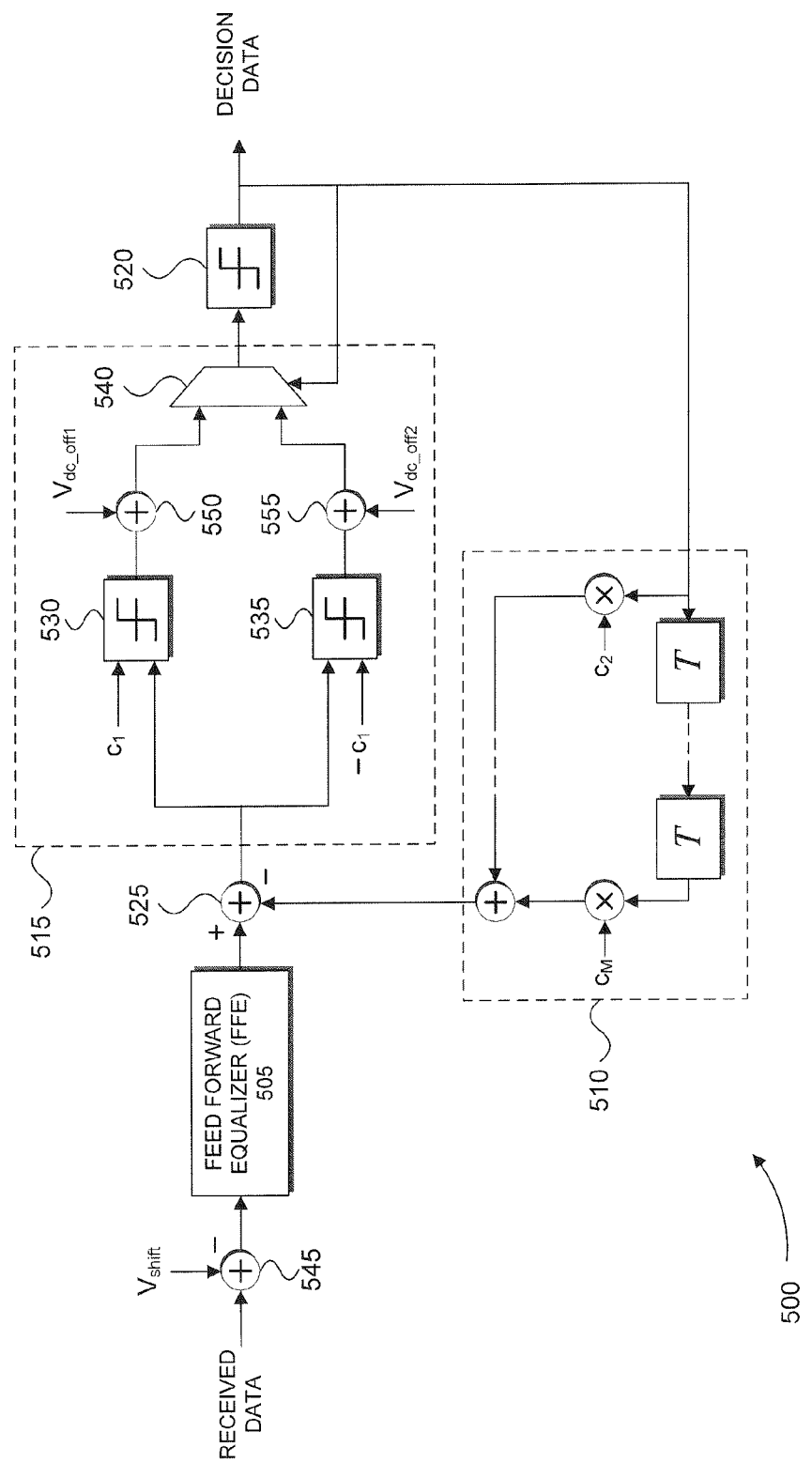
FIG. 5 illustrates a block diagram of a loop-unrolled DFE with multiple circuit blocks for compensating non-idealities, according to embodiments of the present invention.

FIG. 5 illustrates an exemplary block diagram of a loop-unrolled DFE 500 with multiple circuit blocks for compensating (or correcting) non-idealities, according to embodiments of the present invention. In an embodiment, loop-unrolled DFE 500 is implemented in a wired or wireless receiver. For example, loop-unrolled DFE 500 can be implemented within a cellular device, satellite system, cable modem, LAN device, home networking device, or any other wireless or wired device that includes a receiver. In another embodiment, loop-unrolled DFE 500 is implemented within a receiver communicating over a backplane. In such an implementation, loop-unrolled DFE 500 can be included within a serializer/deserializer (SerDes), for example.

Loop-unrolled DFE 500 is similar in structure to loop-unrolled DFE 400 illustrated in FIG. 4. For example, loop-unrolled DFE 500 includes an optional FFE 505, an FBE 510, a loop-unrolling device 515 that unrolls a single tap computation from FBE 510, a slicer 520, and a combiner 525. However, loop-unrolled DFE 500 further includes additional compensation circuit blocks 545, 550, and 555.

The performance of a DFE architecture, such as loop-unrolled DFE 400 and loop-unrolled DFE 500, is generally limited by non-idealities such as frequency response, noise, nonlinearity, and mismatch associated with its data path and the data it operates on. Additional compensation circuit blocks 545, 550, and 555 help to compensate for non-idealities that manifest themselves as unwanted DC offsets, which if left uncorrected would degrade the performance of loop-unrolled DFE 500. Additional compensation circuit blocks 540, 550, and 555 are specifically configured to provide dc shifts to signals within the datapath of loop-unrolled DFE 500. In one embodiment, compensation circuit blocks 540, 550, and 555 are implemented as summing blocks. However, any implementation of compensation circuit blocks 540, 550, and 555 that can provide a desired dc shift to signals in the datapath of DFE 500 can be used.

As illustrated in FIG. 5, compensation circuit block 545 is implemented as a summer block. Compensation circuit block 545 is configured to add a dc offset $V_{shift}$ to received data (i.e., data received over a communication channel) to correct for asymmetries in the data eye of the received data. For example, data transmitted over some channels, such as an optical fiber channel, can have an asymmetric distribution of signal values near the logic high and logic low values resulting in an eye that is either centered above or below the voltage threshold (i.e., a vertical eye asymmetry) separating determination of a logic high value from a logic low value (e.g., a zero volt threshold in a PAM-2 differential signal). Compensation circuit block 545 operates by shifting the received data up or down to center the eye-opening at the threshold level separating a logic high value from a logic low value, and thereby enhances the signal-to-noise ratio at slicers 530 and 535 such that decisions are more accurately made by loop-unrolled DFE 500.

In an alternative embodiment, compensation circuit block 545 can be implemented by injecting a differential current through a pair of resistors, which are optionally implemented as external components in an IC implementation of loop-unrolled DFE 500. The resistors are respectively coupled to differential input lines carrying the received data.

As further illustrated in FIG. 5, compensation circuit blocks 550 and 555 are respectively implemented in the parallel paths of loop-unrolling device 515. Compensation circuit blocks 550 and 555 are respectively configured to add dc offsets $V_{dc\_off1}$ and $V_{dc\_off2}$ to the threshold levels of slicers 530 and 535 to correct for non-idealities. In particular, compensation circuit blocks 550 and 555 are respectively configured to add dc offsets $V_{dc\_off1}$ and $V_{dc\_off2}$ to the threshold levels of slicers 530 and 535 to correct for mismatches in the parameters of devices used to implement loop-unrolled DFE 500.

In an embodiment, loop-unrolled DFE 500 processes differential signals and is implemented within an IC. In an IC, mismatches result from microscopic variations in devices used to implement the circuits within the IC. For example, random, microscopic variations in the charge carrier mobility, oxide capacitance, and the length and width of the gates of two transistors (e.g., MOSFETs, BJTs, JFETs, etc.) that are identically laid out and used on opposite sides of a differential circuit result in mismatch. In addition, random variances in doping levels in the channels and gates of two identically laid out devices result in threshold ($V_{th}$) mismatches. Furthermore, process-induced variations in the values of resistors used as the load devices of circuits can also contribute to the mismatch.

Because of mismatches, the two sides of a differential circuit do not exhibit identical properties and/or bias currents, leading to unwanted dc offsets that adversely affect the performance of these circuits. In a differential implementation of loop-unrolled DFE 500, one or more differential amplifiers and differential circuits can be utilized. Compensation circuit blocks 550 and 555 are respectively configured to add dc offsets $V_{dc\_off1}$ and $V_{dc\_off2}$ to the threshold levels of slicers 530 and 535 to correct for the unwanted dc offset that occurs as a result of mismatches.

Although compensation circuit blocks 545, 550, and 555 improve the performance of loop-unrolled DFE by compensating for non-idealities, these blocks add to the load of the loop-unrolled DFE slowing down the speed at which it can operate. Therefore, what is needed is a DFE architecture that can compensate for one or more non-idealities, such as mismatch between devices used to implement the DFE, while limiting additional loading.

Figure 6:
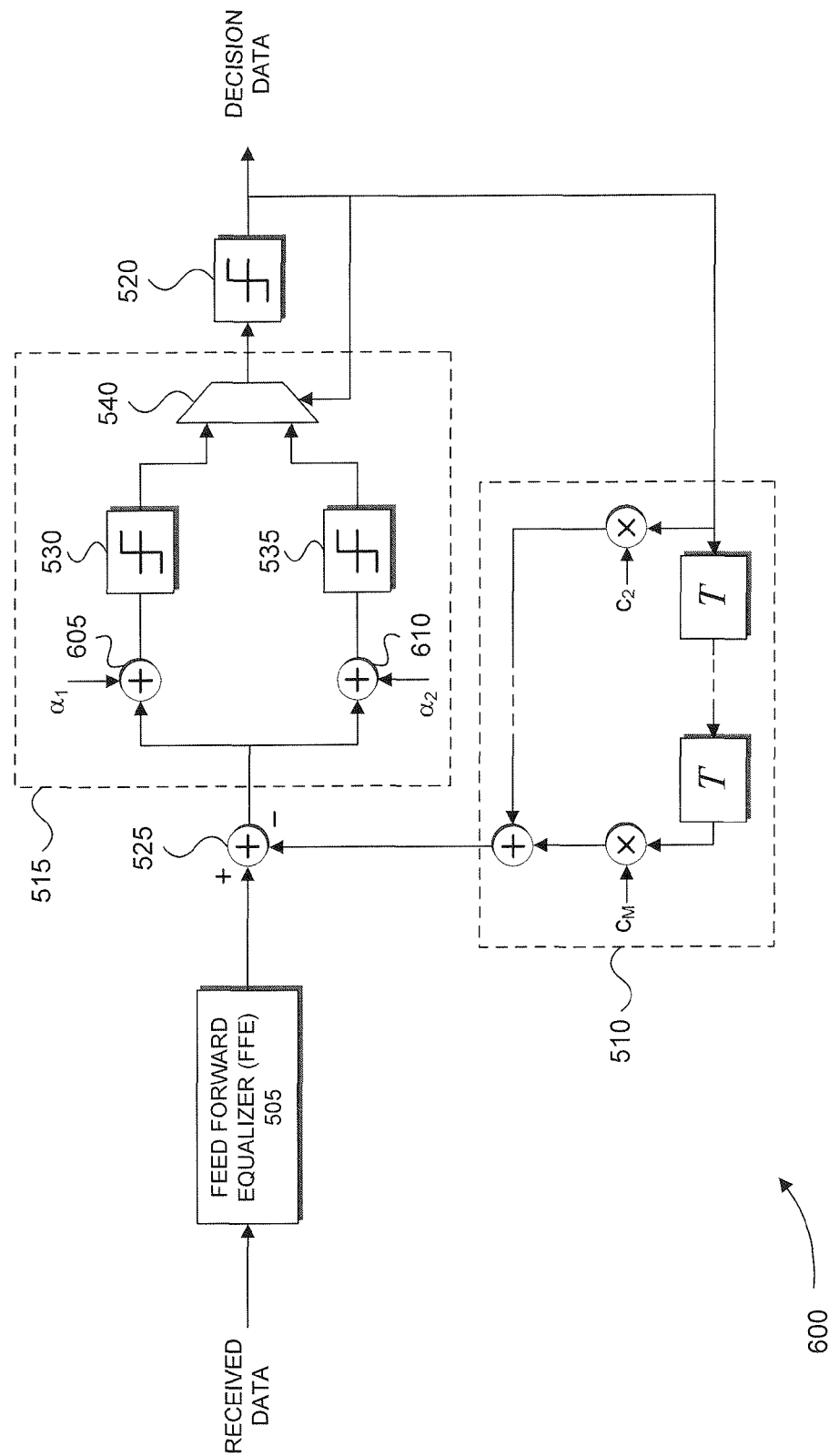
FIG. 6 illustrates a block diagram of a loop-unrolled DFE with a single summer block for compensating one or more non-idealities, according to embodiments of the present invention.

FIG. 6 illustrates an exemplary block diagram of a loop-unrolled DFE 600 with a single summer block that is configured to compensate one or more non-idealities, according to embodiments of the present invention. In an embodiment, loop-unrolled DFE 600 is implemented in a wired or wireless receiver. For example, loop-unrolled DFE 600 can be implemented within a cellular device, satellite system, cable modem, LAN device, home networking device, or any other wireless or wired device that includes a receiver. In another embodiment, loop-unrolled DFE 600 is implemented within a receiver communicating over a backplane. In such an implementation, loop-unrolled DFE 600 can be included within a serializer/deserializer (SerDes), for example.

Loop-unrolled DFE 600 has a similar structure as loop-unrolled DFE 500 illustrated in FIG. 5. However, compensation circuit blocks 545, 550, and 555 have been eliminated and replaced by summer blocks 605 and 610. In addition, the adjustment made to the respective thresholds of slicers 530 and 535 based on tap weight $c_1$ in loop-unrolled DFE 500 has been further eliminated by summer blocks 605 and 610, as will be explained further below.

In general, summer blocks 605 and 610 add a dc offset to the input signal received by slicers 530 and 535, respectively. In an alternative embodiment, summer blocks can be implemented to add the dc offset to the slicer threshold levels at the outputs of slicers 530 and 535, respectively. Specifically, summer block 605 adds a dc offset to the input signal of slicer 535 equal to $\alpha_1$ and summer block 610 adds a dc offset to the input signal of slicer 540 equal to $\alpha_2$. In the embodiment of FIG. 6, $\alpha_1$ and $\alpha_2$ are measured in volts. However, in another embodiment, $\alpha_1$ and $\alpha_2$ are measured in amps.

In an embodiment, dc offset value $\alpha_1$ is determined based on three values: dc offset value $V_{shift}$ (discussed above in regard to FIG. 5) that represents the dc offset value necessary to compensate for asymmetries in the data eye of received data, dc offset value $V_{dc\_off1}$ (discussed above in regard to FIG. 5) that represents the dc offset value necessary to compensate for mismatches present in the circuits of loop unrolled DFE 600, and the first tap weight $c_1$ of FBE 510. In another embodiment, dc offset value $\alpha_1$ is determined based on the sum of the three values $V_{shift}$, $V_{dc\_off1}$, and $c_1$. In yet another embodiment, dc offset value $\alpha_1$ is determined based of the values $V_{shift}$ and $c_1$, or the values $V_{dc\_off1}$ and $c_1$.

Similarly, in an embodiment, dc offset value $\alpha_2$ is determined based on three values: dc offset value $V_{shift}$ (discussed above in regard to FIG. 5) that represents the dc offset value necessary to compensate for asymmetries in the data eye of received data, dc offset value $V_{dc\_off2}$ (discussed above in regard to FIG. 5) that represents the dc offset value necessary to compensate for mismatches present in the circuits of loop unrolled DFE 600, and the negative version of first tap weight $c_1$ of FBE 510. In another embodiment, dc offset value $\alpha_1$ is determined based on the sum of the three values $V_{shift}$, $V_{d\_off2}$, and $-c_1$. In yet another embodiment, dc offset value $\alpha_1$ is determined based of the values $V_{shift}$ and $-c_1$, or the values $V_{dc\_off2}$ and $-c_1$.

Summer blocks 605 and 610 eliminate compensation blocks 545, 550, and 555 illustrated in FIG. 5, thereby reducing the load of loop-unrolled DFE 600. Reducing the load of loop-unrolled DFE 600 provides for faster achievable operating frequencies. In addition, summer blocks 605 and 610 further eliminate the need to shift the threshold levels of slicers 530 and 535. In typical implementations, altering the threshold levels of slicers 530 and 535 requires a summing block within the flip-flop of the slicer and introducing an offset in the trigger level of the flip-flop, each of which increases the loading of slicers 530 and 535. Therefore, eliminating the need to shift the threshold levels of slicers 530 and 535 further provides for faster achievable operating speeds of loop-unrolled DFE 600.

It should be noted that summer blocks 605 and 610 can be implemented in DFE architectures other than loop-unrolled DFE architecture 600. For example, although loop-unrolled DFE 600 includes a single unrolled loop containing one FBE tap computation, summer blocks 605 and 610 can be further replicated in one or more additional unrolled loops within a DFE architecture that unrolls multiple loops. In addition, summer blocks 605 and 610 can be implemented within DFE architectures configured to process different types of modulated signals, including PAM-2, PAM-4, etc., and complex modulation types, including those modulation types that require separate in-phase and quadrature paths within a DFE architecture.

Figure 7:
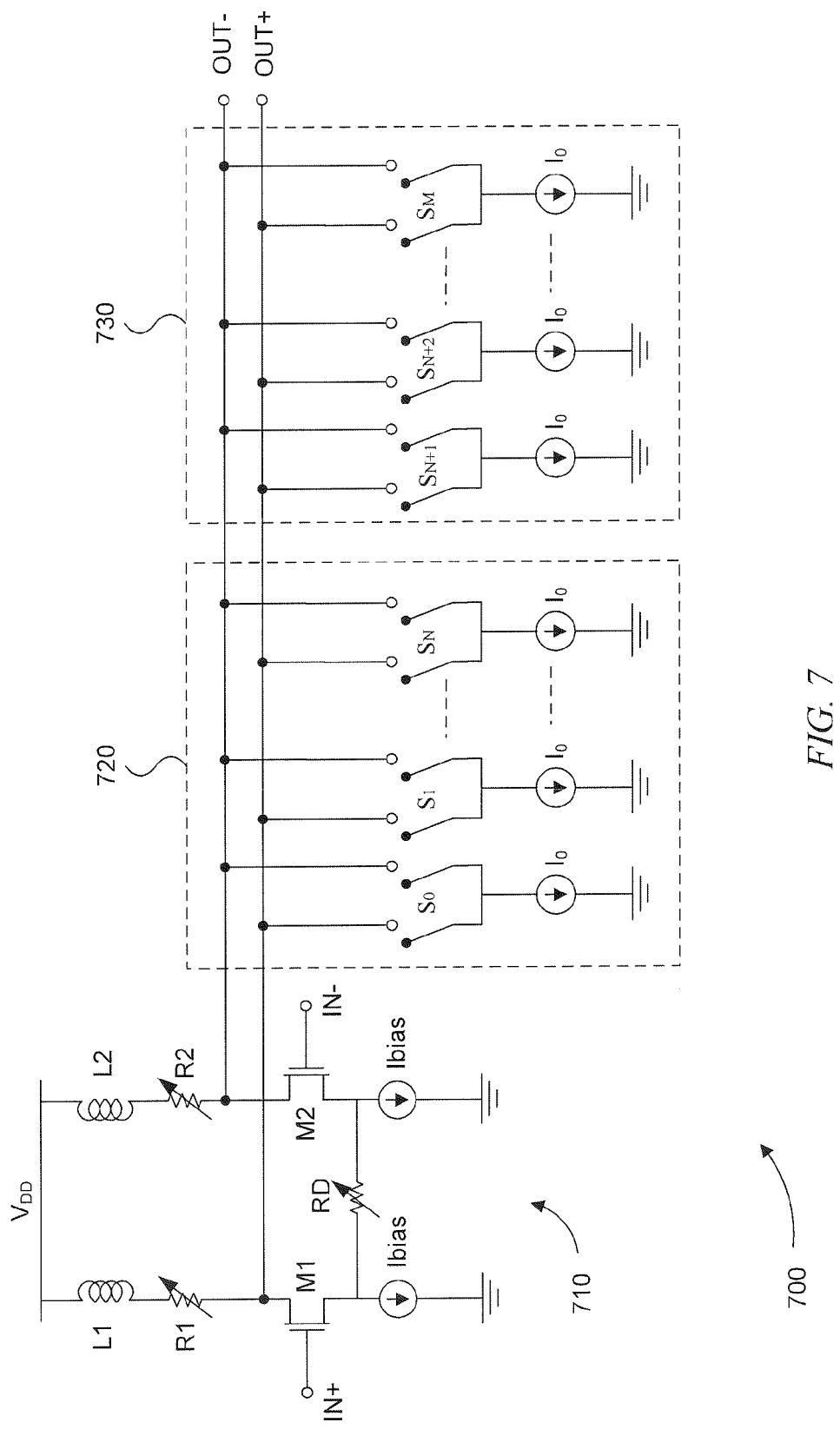
FIG. 7 illustrates an implementation of a summer block for compensating one or more non-idealities in a DFE, according to embodiments of the present invention.

FIG. 7 illustrates an exemplary implementation of a summer block 700 that can be used to implement summer blocks 605 and 610, according to embodiments of the present invention. Summer block 700 includes a gain stage 710 and summing stages 720 and 730.

As illustrated in FIG. 7, gain stage 710 is a current-mode logic buffer having a differential input at terminal nodes IN+ and IN− and a differential output at terminal nodes OUT+ and OUT−. Gain stage 710 includes a pair of transistors M1 and M2 connected together at their sources via degeneration resistor RD. The sources of FET transistors M1 and M2 are respectively coupled to ground through tail current sources that provide a current Ibias. The drains of transistors M1 and M2 are respectively coupled through load resistors R1 and R2 and shunt peaking inductors L1 and L2 to a positive voltage source $V_{DD}$. Degeneration resistor RD improves the linearity of summer block 700, while at the same time reducing its output signal amplitude. Shunt-peaking inductors L1 and L2 enhance the bandwidth of summer block 700.

In an embodiment, to ensure accurate functionality of gain stage 710, degeneration resistor RD and load resistors R1 and R2 can be calibrated against a high-precision external resistor to reduce process induced resistor variations in an IC implementation. In another embodiment, the tail current sources that provide current Ibias can be adjusted to remain relatively constant by deriving the current provided by the current sources using a band-gap voltage reference across, for example, an additional calibrated resistor.

It should be noted that, gain stage 710 is provided for the purpose of illustration and not limitation. Other equivalent implementations and/or variations of gain stage 710 are possible as would be understood by a person skilled in the art based on the teachings herein. Equivalent implementations and/or variations may include, for example, variations in transistor type (e.g., PNP, MOSFET, JFET, CMOS, etc.), variations in amplifier configuration, and variations in amplifier input/output configuration (e.g., single-ended, single-input-single-output, single-input-multiple-output, etc.).

In operation within DFE 600 illustrated in FIG. 6, input nodes IN+ and IN− illustrated in FIG. 7 are, for example, coupled to the output signal of combiner 525 and output nodes OUT+ and OUT− are coupled to the input of either slicer 530 or 535.

In an embodiment, summing stage 720 is configured to provide a dc offset based on the first tap weight $c_1$ of FBE 510 illustrated in FIG. 6, and summing stage 730 is configured to provide a dc offset based on at least one of the following two values: (1) the value $V_{shift}$ that represents the dc offset value necessary to compensate for asymmetries in the data eye of received data, and (2) the value $V_{dc\_off}$ that represents the dc offset value necessary to compensate for mismatches present in the circuits of loop unrolled DFE 600.

Summing stages 720 and 730 include a plurality of unit current sources $I_0$ that are each coupled to the ends of the differential output provided by gain stage 710 at terminal nodes OUT+ and OUT−. More specifically, each unit current source $I_0$ of summing stage 720 and 730 is coupled to the ends of the differential output provided by gain stage 710 at terminal nodes OUT+ and OUT− via respective switch pairs S0-SM. Each switch pair S0-SM is coupled to a respective unit current source $I_0$ and is controlled such that one switch is on and the other switch is off. In other words, each unit current source $I_0$ is coupled to either the positive end or the negative end of the differential output signal provided by gain stage 710 at terminal nodes OUT+ and OUT−. Control over the position of switch pairs S0-SM provides the capability of introducing a differential dc voltage offset at the terminal nodes OUT+ and OUT− by steering the current provided by the unit current sources $I_0$ through either load resistor R1 or R2 of gain stage 710.

It should be noted that additional current sources with non-uniform magnitudes can be included within gain stages 720 and 730. For example, in gain stage 730, it may be beneficial to include one set of current sources to provide a coarse adjustment of the dc offset and another set of current sources to provide a fine adjustment of the dc offset. The current sources providing coarse adjustment can provide a greater amount of current than the current sources providing fine adjustment. In addition, it should be noted that, although the use of unit size current sources can be used to beneficially reduce variation, other types of weighted current sources can be used, such as a binary weighted set of current sources within gain stages 720 and 730.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A Decision Feedback Equalizer (DFE) comprising:
   a Feed Forward Equalizer (FFE) configured to process an unequalized data signal to provide a FFE data signal;
   a Feedback Equalizer (FBE) configured to process a decision data signal to provide a FBE data signal;
   a loop unrolling device configured to add a direct current (DC) offset, using a summer block, to a combination of the FFE data signal and the FBE data signal to provide an offset data signal and to process the offset data signal to provide an equalized data signal, wherein the DC offset is determined based on:
      a FBE tap weight value, and
      at least one of a vertical eye asymmetry in the unequalized data signal and parameter mismatches of devices used to implement the DFE; and
   a decision device configured to process the equalized data signal to provide the decision data signal.

2. The DFE of claim 1, wherein the devices comprise transistors and the parameter mismatches comprise at least one of a mismatch between threshold voltages of the devices, a mismatch between charge carrier mobility, a mismatch between gate oxide capacitance, a mismatch between channel lengths of the devices, and a mismatch between channel widths of the devices.

3. The DFE of claim 1, wherein the devices comprise resistors and the parameter mismatches comprise a mismatch in resistance values associated with the resistors.

4. The DFE of claim 1, wherein the summer block comprises:
   a gain stage configured to amplify the combination of the FFE data signal and the FBE data signal to provide an amplified version of the combination of the FFE data signal and the FBE data signal at an output; and
   a summing stage configured to add the DC offset to the amplified version of the combination of the FFE data signal and the FBE data signal to provide the offset data signal.

5. The DFE of claim 4, wherein the gain stage is a current-mode logic buffer.

6. The DFE of claim 4, wherein the summing stage includes a plurality of current sources and is configured to couple one or more of the plurality of current sources to the output of the gain stage to add the DC offset.

7. The DFE of claim 1, wherein the summer block adds the DC offset to the combination of the FFE data signal and the FBE data signal by adjusting a threshold level of a slicer within the loop unrolling device.

8. A Decision Feedback Equalizer (DFE) comprising:
   a loop unrolling device configured to add a direct current (DC) offset, using a summer block, to an unequalized data signal received over a channel to provide an offset data signal and to process the offset data signal to provide an equalized data signal, wherein the DC offset is determined based on:
      a Feedback Equalizer (FBE) tap weight value, and
      at least one of a vertical eye asymmetry in the unequalized data signal and parameter mismatches of devices used to implement the DFE; and
   a decision device configured to process the equalized data signal to provide a decision data signal.

9. The DFE of claim 8, wherein the devices comprise transistors and the parameter mismatches comprise at least one of a mismatch between threshold voltages of the devices, a mismatch between charge carrier mobility, a mismatch between gate oxide capacitance, a mismatch between channel lengths of the devices, and a mismatch between channel widths of the devices.

10. The DFE of claim 8, wherein the devices comprise resistors and if e parameter mismatches comprise a mismatch in resistance values associated with the resistors.

11. The DFE of claim 8, wherein the summer block comprises:
   a gain stage configured to amplify the unequalized data signal to provide an amplified version of the unequalized data signal at an output; and
   a summing stage configured to add the DC offset to the amplified version of the unequalized data signal to provide the offset data signal.

12. The DFE of claim 11, wherein the gain stage is a current-mode logic buffer.

13. The DFE of claim 11, wherein the summing stage includes a plurality of current sources and is configured to couple one or more of the plurality of current sources to the output of the gain stage to add the DC offset.

14. The DFE of claim 8, wherein the summer block adds the DC offset to the unequalized data signal by adjusting a threshold level of a slicer within the loop unrolling device.

15. A summer block implemented in a Decision Feedback Equalizer (DFE), the summer block configured to add a direct current (DC) offset to a data signal received over a channel, the summer block comprising:
   a gain stage configured to amplify the data signal to provide an amplified version of the data signal at an output; and
   a summing stage configured to add the DC offset to the amplified version of the data signal to provide an offset data signal, wherein the DC offset is determined based on:
      a Feedback Equalizer tap weight value, and at least one of a vertical eye asymmetry in the data signal and parameter mismatches of devices used to implement the DFE.

16. The summer block of claim 15, wherein the devices comprise transistors and the parameter mismatches comprise at least one of a mismatch between threshold voltages of the devices, a mismatch between charge carrier mobility, a mismatch between gate oxide capacitance, a mismatch between channel lengths of the devices, and a mismatch between channel widths of the devices.

17. The summer block of claim 15, wherein the devices comprise resistors and the parameter mismatches comprise a mismatch in resistance values associated with the resistors.

* * * * *

UNITED STATES PATENT AND TRADEMARK OFFICE
CERTIFICATE OF CORRECTION

PATENT NO. : 8,457,190 B2
APPLICATION NO. : 12/878689
DATED : June 4, 2013
INVENTOR(S) : Bharath Raghavan et al.

It is certified that error appears in the above-identified patent and that said Letters Patent is hereby corrected as shown below:

Title Page, Item (57), Abstract, Line 5, please replace "amount:" with --amount.--.

In the Claims

Column 12, Line 38, please replace "if e parameter" with --the parameter--.

Signed and Sealed this
Sixteenth Day of July, 2013

Teresa Stanek Rea
*Acting Director of the United States Patent and Trademark Office*